US012753778B1

(12) United States Patent
Xu

(10) Patent No.: US 12,753,778 B1
(45) Date of Patent: Oct. 6, 2026

(54) HANDHELD CAMERA FAN

(71) Applicant: Shenzhen Xinyifang International Trade Co., Ltd., Shenzhen (CN)

(72) Inventor: Lihua Xu, Shenzhen (CN)

(73) Assignee: Shenzhen Xinyifang International Trade Co., Ltd., Shenzhen (CN)

( * ) Notice: Subject to any disclaimer, the term of this patent is extended or adjusted under 35 U.S.C. 154(b) by 0 days.

(21) Appl. No.: 19/460,721

(22) Filed: Jan. 27, 2026

(51) Int. Cl.

| | |
|---|---|
| ***F04D 29/64*** | (2006.01) |
| ***F04D 19/00*** | (2006.01) |
| ***F04D 29/70*** | (2006.01) |
| ***G03B 29/00*** | (2021.01) |

(52) U.S. Cl.
CPC ......... *F04D 29/646* (2013.01); *F04D 19/002* (2013.01); *F04D 29/703* (2013.01); *G03B 29/00* (2013.01)

(58) Field of Classification Search
CPC .... F04D 25/084; F04D 29/646; F04D 29/703; F04D 19/002; G03B 29/00; G03B 17/566
See application file for complete search history.

(56) References Cited

U.S. PATENT DOCUMENTS

| | | | | |
|---|---|---|---|---|
| 10,104,210 B1 * | 10/2018 | Zenebe | ............... | H04M 1/0272 |
| 12,480,506 B1 * | 11/2025 | Zhan | ................... | F04D 25/0673 |
| 2005/0213960 A1 * | 9/2005 | Baldwin | ................ | G03B 17/02 396/439 |
| 2007/0231157 A1 * | 10/2007 | Chuang | ................. | F04D 29/703 416/247 R |
| 2017/0000292 A1 * | 1/2017 | Park | ........................ | F24C 7/085 |
| 2017/0198703 A1 * | 7/2017 | Leitman | ................. | H01R 35/00 |
| 2017/0356672 A1 * | 12/2017 | Kim | ......................... | F24F 11/30 |
| 2018/0135634 A1 * | 5/2018 | Leitman | .................. | H04M 1/21 |
| 2019/0101126 A1 * | 4/2019 | Porter | ................. | F04D 25/0673 |

(Continued)

FOREIGN PATENT DOCUMENTS

| | | | | |
|---|---|---|---|---|
| CN | 216812235 U * | 6/2022 | ........... | F04D 25/082 |
| CN | 120251535 A * | 7/2025 | ............ | H02K 11/33 |

(Continued)

OTHER PUBLICATIONS

Gsmarena, Samsung Galaxy A55, Mar. 11, 2024, <https://www.gsmarena.com/samsung_galaxy_a55-12824.php>, retrieved 2026 (Year: 2024).*

*Primary Examiner* — Ryan C Clark
(74) *Attorney, Agent, or Firm* — JEEN IP LAW, LLC

(57) ABSTRACT

Provided is a handheld camera fan, which includes a handheld main machine. A top of the handheld main machine is rotatably connected to a connection arm, and another end of the connection arm is connected to a fan component; the fan component includes an installation cylinder, and an interior of the installation cylinder is provided with fan blades; the installation cylinder is provided with a camera adjacent to a center of an air inlet. The present disclosure integrates the camera at the center of the air inlet of the installation cylinder of the fan component and cooperates with the handheld main machine to effectively solve a significant defect of a single function of existing handheld fans. It enables a user to enjoy the instant cooling experience brought by portable air supply without carrying additional specialized camera equipment, and can easily capture, preview and record images with one hand.

7 Claims, 3 Drawing Sheets

(56) References Cited

U.S. PATENT DOCUMENTS

| | | | | |
|---|---|---|---|---|
| 2020/0329806 | A1* | 10/2020 | Wong | A42B 3/04 |
| 2023/0366408 | A1* | 11/2023 | Kesterson | G06V 40/10 |
| 2024/0401604 | A1* | 12/2024 | Lin | F04D 19/002 |
| 2025/0257740 | A1* | 8/2025 | He | F04D 29/703 |
| 2025/0278013 | A1* | 9/2025 | Sato | G03B 17/55 |
| 2025/0290524 | A1* | 9/2025 | Chen | F04D 25/084 |

FOREIGN PATENT DOCUMENTS

| | | | | |
|---|---|---|---|---|
| EP | 3034948 | A1 * | 6/2016 | F24C 15/024 |
| KR | 102835227 | B1 * | 7/2025 | H04M 1/0279 |
| WO | WO-2021139532 | A1 * | 7/2021 | H02K 9/06 |

* cited by examiner

HANDHELD CAMERA FAN

TECHNICAL FIELD

The present disclosure relates to the field of fan technologies, and in particular, to a handheld camera fan.

BACKGROUND

Handheld fan is a small electric air supply device that is designed to be lightweight and easy to grip with one hand. It usually has a built-in rechargeable battery as a power source, which drives the fan blades to rotate and generate directional airflow through a motor. This device is mainly used in outdoor activities, commuting, indoor mobility, or local spaces, aiming to provide a user with instant and directional blowing to alleviate heat sensation, promote sweat evaporation, and achieve perceived cooling. It is a portable personal air supply device that differs from fixed fans.

The existing handheld fan products generally have the problem of single functionality. Its main or even only function is limited to providing local air supply. This single functionality leads to significant limitations in its application scenarios, rendering it difficult to meet the growing demand of users for multifunctional integrated devices while enjoying the convenience of portable air supply. For example, when the user engages in outdoor activities or travel, he often needs to simultaneously record images (such as taking photos or videos), but existing handheld fans cannot provide such auxiliary functions, the user are forced to carry specialized camera equipment, which not only increases the burden of carrying, but also reduces the convenience of use, and is particularly inconvenient in one handed operation scenarios. Therefore, it is urgent to develop a new handheld device that can effectively integrate image capture capabilities and retaining the core function of portable air supply to expand its application scope and enhance user experience.

SUMMARY

In order to solve the above technical problems, the present disclosure provides a handheld camera fan, which is achieved by the following specific technical means.

A handheld camera fan, including: a handheld main machine, where a top of the handheld main machine is rotatably connected to a connection arm, and another end of the connection arm is connected to a fan component; the fan component includes an installation cylinder, and an interior of the installation cylinder is provided with fan blades; where the installation cylinder is provided with a camera adjacent to a center of an air inlet.

In some embodiments of the present disclosure, the installation cylinder includes an outer cylinder, and an inner cylinder is fixedly provided inside the outer cylinder; the inner cylinder is provided with an installation bracket at one end adjacent to an air outlet, and a motor is fixedly provided at a center of an inner side of the installation bracket, the motor is connected to the fan blades for transmission.

In some embodiments of the present disclosure, a nixie tube is provided at a center of an outer side of the installation bracket configured to display fan gear information; the outer side of the installation bracket close to the nixie tube is provided with a protective cover, and the protective cover is hemispherical.

In some embodiments of the present disclosure, a rear fixing ring and a front fixing ring are respectively provided at two ends of the outer cylinder configured for limiting and fixing the inner cylinder; ends of the rear fixing ring and the front fixing ring are both provided with a plurality of sets of connecting claws, and two ends of the inner cylinder are provided with clamp blocks corresponding to the connecting claws and connected to the connecting claws.

In some embodiments of the present disclosure, a fixing frame is provided at a center of the rear fixing ring, and the camera is fixedly provided at a center of an outer side of the fixing frame; a protective net is provided between the rear fixing ring and the inner cylinder.

In some embodiments of the present disclosure, a display screen is fixedly provided on a front of the handheld main machine, and a plurality of sets of control buttons are provided below the display screen; one side of the handheld main machine is provided with a speaker.

In some embodiments of the present disclosure, the handheld main machine is internally provided with a motherboard and a battery, and one side of the motherboard is provided with a Micro SD card slot and a source interface.

In some embodiments of the present disclosure, another side of the handheld main machine is provided with an adjustment button and a power supply switch; one end of the handheld main machine is further provided with a hanging rope hole.

Compared with existing technologies, the present disclosure has the following beneficial effects.

The present disclosure integrates the camera at the center of the air inlet of the installation cylinder of the fan component, and cooperates with the display screen, control buttons, speaker, motherboard, Micro SD card slot and other components on the handheld main machine to effectively solve the significant defect of the single function of the existing handheld fan. It enables the user to enjoy the instant cooling experience brought by portable air supply without carrying additional specialized camera equipment, and can easily capture, preview and record images with one hand. It not only significantly reduces the burden of carrying for user, but also greatly improves the convenience and efficiency of use in outdoor activities, travel, self-media creation, on-site recording and other scenarios, expanding the functional boundary of traditional single air supply devices to the field of personal portable imaging.

Numeral reference: 1—handheld main machine; 2—outer cylinder; 3—connection arm; 4—inner cylinder; 5—fan blade; 6—protective net; 7—rear fixing ring; 8—camera; 9—nixie tube; 10—protective cover; 11—front fixing ring; 101—display screen; 102—control button; 103—speaker; 104—power supply switch; 105—source interface; 106—Micro SD card slot; 107—adjustment button; 108—hanging rope hole.

DESCRIPTION OF EMBODIMENTS

Below, a further detailed description of the embodiments of the present disclosure will be provided in combination with the accompanying drawings and examples. The following examples are used to illustrate the present disclosure, but cannot be used to limit the scope of the present disclosure.

In the description of the present disclosure, unless otherwise specified, the meaning of "a plurality of" refers to two or more; terms "up", "down", "left", "right", "inside", "outside", "front", "rear", "head", "tail" and other directional or positional relationships indicated are based on the directional or positional relationships shown in the accompanying drawings, only for a convenience of describing the present disclosure and simplifying the description, and do not indicate or imply that the device or component referred to must have a specific orientation, be constructed and operated in a specific orientation, and therefore cannot be understood as limiting the present disclosure. Besides that, terms "first", "second", "third", etc. are only used for descriptive purposes and cannot be understood as indicating or implying relative importance.

In the description of the present disclosure, it should be noted that unless otherwise specified and limited, the terms "connected to" and "connected with" should be broadly understood, for example, it can be a fixed connection, a detachable connection, or an integrated connection; it can be a mechanical connection or an electrical connection; it can be directly connected or indirectly connected through an intermediate medium. For those skilled in the art, specific meanings of the above terms in the present disclosure can be understood in specific situations.

Figure 1:
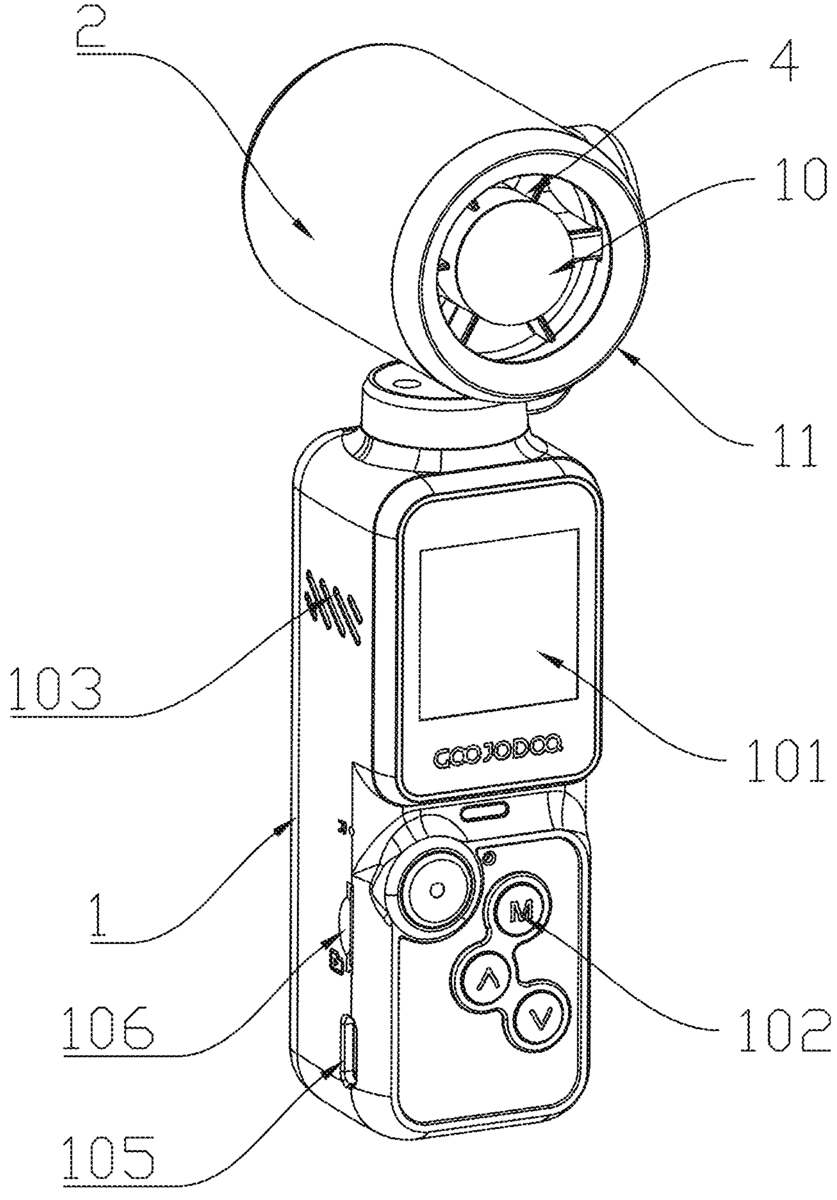
FIG. 1 is a first schematic diagram of an overall structure of the present disclosure.
Figure 2:
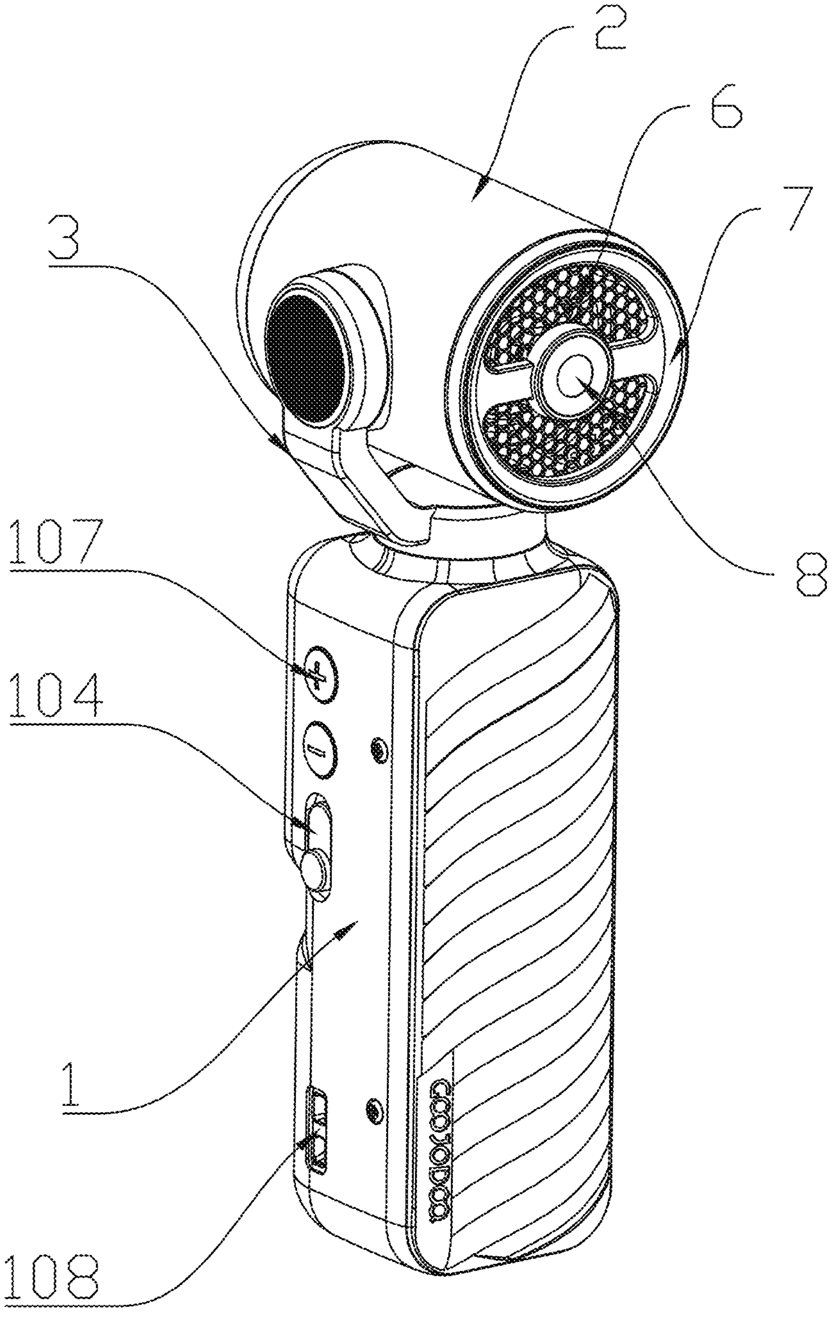
FIG. 2 is a second schematic diagram of the overall structure of the present disclosure.
Figure 3:
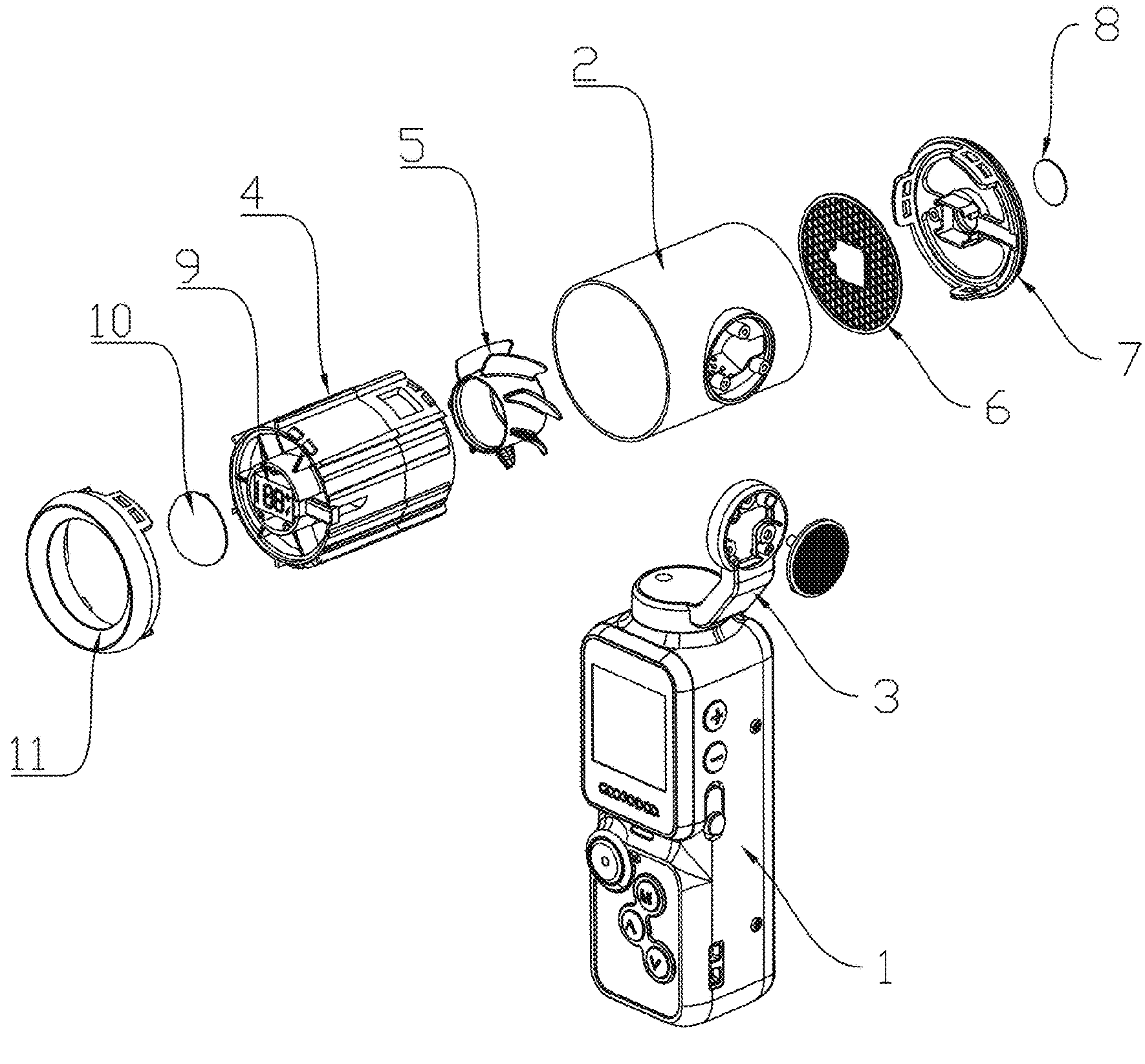
FIG. 3 is a schematic diagram of a disassembly of a fan component of the present disclosure.

As shown in FIGS. 1 to 3. The present disclosure provides a handheld camera fan, including a handheld main machine 1. A top of the handheld main machine 1 is rotatably connected to a connection arm 3, and another end of the connection arm 3 is connected to a fan component; and the fan component include an installation cylinder, an interior of the installation cylinder is provided with fan blades 5; the installation cylinder is provided with a camera 8 adjacent to a center of its air inlet. The camera 8 is integrated at the center of the air inlet of the installation cylinder of the fan component, so that the camera 8 can avoid the obstruction caused by a rotation of the fan blades 5 to a greatest extent possible, and obtain a clear and unobstructed shooting field of view; at the same time, airflow at the air inlet can also assist in dissipating heat from the camera 8, thereby improving its operational stability.

Where the installation cylinder includes an outer cylinder 2, and an inner cylinder 4 is fixedly provided inside the outer cylinder 2. The inner cylinder 4 is provided with an installation bracket at one end adjacent to an air outlet, and a motor is fixedly provided at a center of an inner side of the installation bracket, the motor is connected to the fan blades 5 for transmission. The double-layer structure design of the outer cylinder 2 wrapping the inner cylinder 4 enhances the overall structural rigidity, effectively reduces the noise and vibration generated by a high-speed rotation of the motor and fan blades 5, and improves the comfort of use. The installation bracket at a tail end of the inner cylinder 4 provides a stable support platform for the motor, ensuring smooth operation of the motor. The fan blades 5 have high rotational concentricity and better air supply efficiency.

Where, a nixie tube 9 is provided at a center of an outer side of the installation bracket to display fan gear information. The installation bracket is provided with a protective cover 10 on an outer side close to the nixie tube 9, and the protective cover 10 is hemispherical. The nixie tube 9 is arranged in a center of the outer side of the installation bracket, with a prominent position, for a user to intuitively and clearly view the current working gear information of the fan. The hemispherical protective cover 10 covers an outside of the nixie tube 9, effectively protecting the nixie tube 9 from dust, water vapor erosion, and accidental collision damage. At the same time, its transparent or semi-transparent material ensures clear and visible display content, improving the durability and reliability of the device.

Where two ends of the outer cylinder 2 are respectively provided with a rear fixing ring 7 and a front fixing ring 11 for limiting and fixing the inner cylinder 4. One ends of the rear fixing ring 7 and the front fixing ring 11 are both provided with a plurality of sets of connecting claws, and two ends of the inner cylinder 4 are provided with clamp blocks corresponding to the connecting claws and connected to the connecting claws. The rear fixing ring 7 and the front fixing ring 11 are connected through the connecting claws cooperation with the clamp blocks at two ends of the inner cylinder 41, thereby achieving precise positioning and firm fixation of the inner cylinder 4 inside the outer cylinder 2. The snap connection method makes the assembly and disassembly of the fan component more convenient and efficient, thereby facilitating production manufacturing and later maintenance.

Where, a fixing frame is provided at a center of the rear fixing ring 7, and the camera 8 is fixedly provided at a center of an outer of the fixing frame. A protective net 6 is provided between the rear fixing ring 7 and the inner cylinder 4. The fixing bracket specially arranged at the center of the rear fixing ring 7 provides a reliable and accurate installation base for the camera 8, thereby ensuring that the camera 8 remains stable during equipment operation and reducing the impact of shaking on imaging quality; the protective net 6 can effectively prevent user's fingers, hair, or other foreign objects from being sucked into the high-speed rotating fan blades from the air inlet, ensuring safe use; at the same time, it can also prevent large particles of dust from directly entering the interior of the equipment, protecting internal components.

Where a front of the handheld main machine 1 is fixedly provided with a display screen 101, and a plurality of sets of control buttons 102 are provided below the display screen 101. One side of the handheld main machine 1 is provided with a speaker 103. The display screen 101 located on the front of the handheld main machine 1 can display real-time images captured by the camera 8, allowing the user to accurately frame and compose images, preview captured photos/videos, replay recorded images, and also display information such as fan working state and battery level. The plurality of sets of control buttons 102 are centrally provided at a bottom of a screen, rendering it easy for the user to operate with one hand and achieve flexible control over the camera function; the speaker 103 can provide operation prompt sound, play recorded sound or video accompaniment, thereby enhancing user interaction experience.

Where the handheld main machine 1 is provided with a motherboard and a battery inside, and one side of the motherboard is provided with a Micro SD card slot 106 and a source interface 105. The built-in battery provides an independent and portable power source for the entire device, thereby eliminating reliance on fixed power sources. The motherboard integrates core control circuits; the Micro SD card slot 106 supports storage cards to be inserted, providing large capacity and convenient storage for photos and videos taken, facilitating data transfer and backup. The source interface 105 (such as USB Type-C) is used to charge the battery safely and efficiently, ensuring the device's endurance.

Where another side of the handheld main machine 1 is provided with an adjustment button 107 and a power supply switch 104. One end of the handheld main machine 1 is further provided with a hanging rope hole 108. The adjustment button 107 is configured to adjust the air volume of the fan, enhancing its flexibility in use. The independent power supply switch 104 facilitates the user to quickly turn on or off the power of the entire device. The hanging rope hole 108 allows the user to connect wristbands or hanging ropes, thereby providing additional safety protection when held in hand, preventing the device from accidentally slipping and falling, enhancing the convenience and reliability of portable use.

The working principle of this embodiment: after the user turns on the power supply switch 104, the internal battery of the handheld main machine 1 supplies power to the entire system. The motherboard immediately starts and initializes each functional module.

The user can operate through the adjustment button 107 on one side of the handheld main machine 1: the fan gear is selected, and the motherboard controls the motor driving the fan blades 5 on the installation bracket at the end of the inner cylinder 4 of the fan component to rotate at high speed. The airflow is sucked in from the air inlet, guided and accelerated by the inner cylinder 4, and blown out from the air outlet at the front fixing ring 11, thereby providing directional air supply and cooling for the user. At the same time, the camera 8 integrated on the outer side of the fixing bracket at the center of the rear fixing ring 7 is activated, and its shooting field of view is located at the center of the air inlet, effectively avoiding the obstruction caused by the rotation of the fan blades 5 and capturing clear front images, the image data is transmitted in real-time to the motherboard of the handheld main machine 1 for processing, and displayed on the front display screen 101 for the user to preview the scene. The user can execute photo or video commands through the control button 102, and the recorded images are stored in the memory card that is inserted into the Micro SD card slot 106. During the entire operation process, the fan component is connected to the handheld main machine 1 through the connection arm 3, rendering it easy to adjust the air supply and shooting angle. The outer cylinder 2, the inner cylinder 4, and the rear fixing ring 7 and the front fixing ring 11, which are tightly matched with the clamp block structure through the connecting claws, together form a stable support structure to ensure smooth operation of the motor and the camera 8. After the device is used, the battery can be charged through the source interface 105, and a hanging rope can be added to the hanging rope hole 108 to enhance portability and safety.

The embodiments of the present disclosure are provided for the purpose of illustration and description, and are not exhaustive or limited to the disclosed form. Many modifications and changes are obvious to those skilled in the art. The selection and description of embodiments are to better illustrate the principles and practical applications of the present disclosure, and to enable ordinary skilled persons in the art to understand the present disclosure and design various embodiments with various modifications suitable for specific purposes.

What is claimed is:

1. A handheld camera fan, comprising: a handheld main machine, wherein a top of the handheld main machine is rotatably connected to a connection arm, and another end of the connection arm is connected to a fan component; the fan component comprises an installation cylinder, and an interior of the installation cylinder is provided with fan blades;

wherein the installation cylinder is provided with a camera adjacent to a center of an air inlet, wherein the installation cylinder comprises an outer cylinder, and an inner cylinder is fixedly provided inside the outer cylinder, wherein a rear fixing ring and a front fixing ring are respectively provided at two ends of the outer cylinder configured for limiting and fixing the inner cylinder, wherein a fixing frame is provided at a center of the rear fixing ring, and the camera is provided at a center of an outer side of the fixing frame; a protective net is provided between the rear fixing ring and the inner cylinder.

2. The handheld camera fan according to claim 1, wherein the inner cylinder is provided with an installation bracket at one end adjacent to an air outlet, and a motor is fixedly provided at a center of an inner side of the installation bracket, the motor is connected to the fan blades for transmission.

3. The handheld camera fan according to claim 2, wherein a nixie tube is provided at a center of an outer side of the installation bracket configured to display fan gear information; the outer side of the installation bracket close to the nixie tube is provided with a protective cover, and the protective cover is hemispherical.

4. The handheld camera fan according to claim 2, wherein ends of the rear fixing ring and the front fixing ring are both provided with a plurality of sets of connecting claws, and two ends of the inner cylinder are provided with clamp blocks corresponding to the connecting claws and connected to the connecting claws.

5. The handheld camera fan according to claim 1, wherein a display screen is fixedly provided on a front of the handheld main machine, and a plurality of sets of control buttons are provided below the display screen; one side of the handheld main machine is provided with a speaker.

6. The handheld camera fan according to claim 5, wherein the handheld main machine is internally provided with a motherboard and a battery, and one side of the motherboard is provided with a Micro SD card slot and a source interface.

7. The handheld camera fan according to claim 6, wherein another side of the handheld main machine is provided with an adjustment button and a power supply switch; one end of the handheld main machine is further provided with a hanging rope hole.

* * * * *